United States Patent [19]

Janiszewski

[11] Patent Number: 5,417,125
[45] Date of Patent: May 23, 1995

[54] AUTOMATIC TRANSMISSION FOR MOTOR VEHICLES

[75] Inventor: Grzegorz Janiszewski, Angered, Sweden

[73] Assignee: AB Volvo, Goteborg, Sweden

[21] Appl. No.: 70,480

[22] PCT Filed: Dec. 5, 1991

[86] PCT No.: PCT/SE91/00836
§ 371 Date: Sep. 22, 1993
§ 102(e) Date: Sep. 22, 1993

[87] PCT Pub. No.: WO92/10380
PCT Pub. Date: Jun. 25, 1992

[30] Foreign Application Priority Data
Dec. 10, 1990 [SE] Sweden .................. 9003938

[51] Int. Cl.⁶ .............................................. F16H 3/08
[52] U.S. Cl. ................................... 74/359; 74/360
[58] Field of Search .................... 74/357, 359, 360

[56] References Cited

U.S. PATENT DOCUMENTS

| | | | |
|---|---|---|---|
| 2,972,899 | 2/1961 | Wiggerman | 74/360 |
| 4,375,171 | 3/1983 | Morscheck | 74/359 |
| 4,579,015 | 4/1986 | Fukui | 74/360 |
| 4,776,227 | 10/1988 | Janiszewski | 74/357 |
| 4,960,005 | 10/1990 | Kashiwase | 74/360 |

FOREIGN PATENT DOCUMENTS 2110324 6/1983 United Kingdom .................. 74/357

Primary Examiner—Edward K. Look
Assistant Examiner—Mark Sgantzos
Attorney, Agent, or Firm—Young & Thompson

[57] ABSTRACT

An automatic transmission for motor vehicles, comprising an input shaft (2) driven by a torque converter (3). The input shaft drives via two countershafts (6, 7), an output shaft or a crown gear (42) and a differential. The countershafts each have an individual releasable gear (13, 14) in engagement with a common driving gear (12) on the input shaft, as well as individual releasable gears (8, 9) in engagement with individual drive gears (4, 5) on the input shaft. The arrangement makes up a drive module which can be used in a four-speed transmission for front-wheel drive or in a five-speed transmission for rear-wheel drive.

6 Claims, 4 Drawing Sheets

AUTOMATIC TRANSMISSION FOR MOTOR VEHICLES

BACKGROUND OF THE INVENTION

1. Field of the Invention

The present invention relates to an automatic transmission for motor vehicles, comprising an input shaft driven by a torque converter, two counter shafts alternately driveable by the input shaft, an output element and gears grouped in pairs on the shafts for driving the output element from the input shaft via one or the other of the counter shafts, at least one gear in each gear pair co-operating between the input shaft and the respective countershaft being freely rotatably mounted on its associated shaft and being lockable to the shaft by means of a friction clutch.

2. Description of the Related Art

Automatic transmissions of this type, i.e. those provided with counter shafts, are simpler and less expensive to manufacture, especially for manufacturers already producing manual transmissions, than are the conventional type of automatic transmission using interconnected sets of planetary gears, wherein the sun gear and/or annulus and cage are locked or released with the aid of brakes and interleaved clutches. Transmissions with twin counter shafts can also be designed significantly shorter in the axial direction than transmissions based on planetary gearing, and this makes them particularly suited for use in front-wheel drive vehicles with transverse engines.

SUMMARY OF THE INVENTION

The purpose of the present invention is, starting from an automatic transmission with twin counter shafts, to provide a transmission which, while maintaining an optimally short length, can be designed to provide great freedom as regards selection of gear ratio at the same time as a single basic design for four forward gear ratios and one reverse gear ratio can be used without modification of the gear and clutch arrangement in both a four-speed transmission for front-wheel drive with a transverse engine and a five-speed transmission for rear-wheel drive with a longitudinally mounted engine.

This is achieved according to the invention by virtue of the fact that said counter shafts have at least one pair of gears, which are rotatably mounted and lockable to their respective shafts by a friction clutch and engage a common driving gear mounted on the input shaft, and at least two additional gears, which are freely rotatably mounted and lockable to their respective counter shafts by a friction clutch, said additional two gears engaging different driving gears on the input shaft.

The design according to the invention makes possible rational manufacture of automatic transmissions for both front-wheel drive and rear-wheel drive vehicles since most of the individual components in the transmissions can be common to both and be identically disposed in the transmission housing in both versions.

BRIEF DESCRIPTION OF THE DRAWINGS

The invention will be described in more detail with reference to examples shown in the accompanying drawings, where.

DESCRIPTION OF THE PREFERRED EMBODIMENTS

Figure 1:
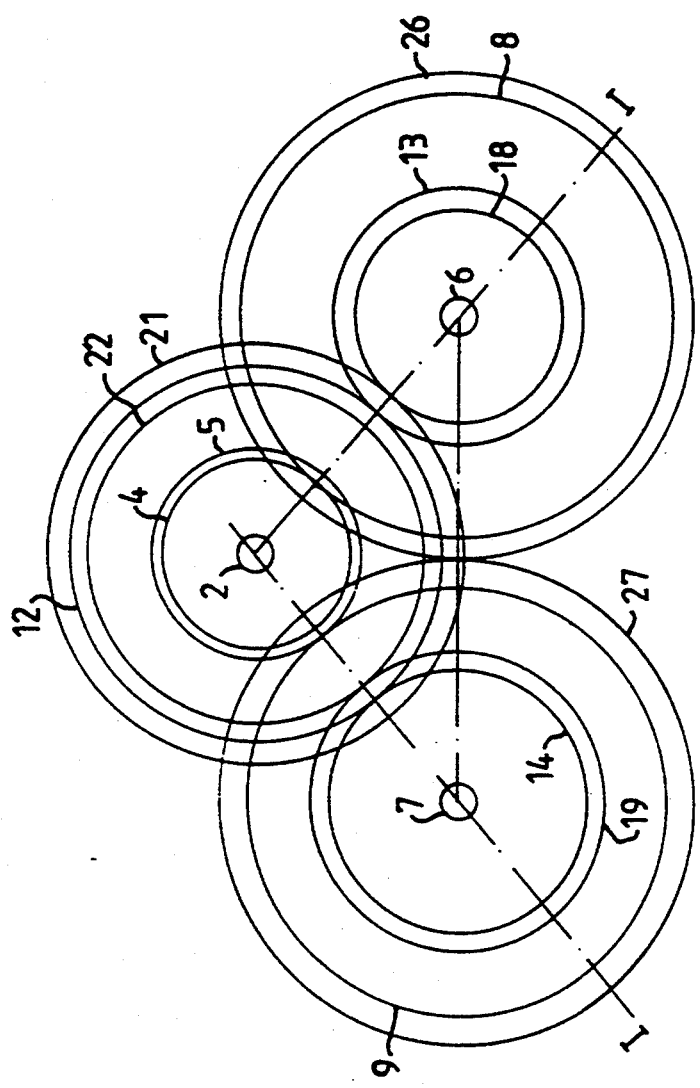
FIG. 1 shows a schematic end view of a transmission according to the invention for rear-wheel drive.
Figure 2:
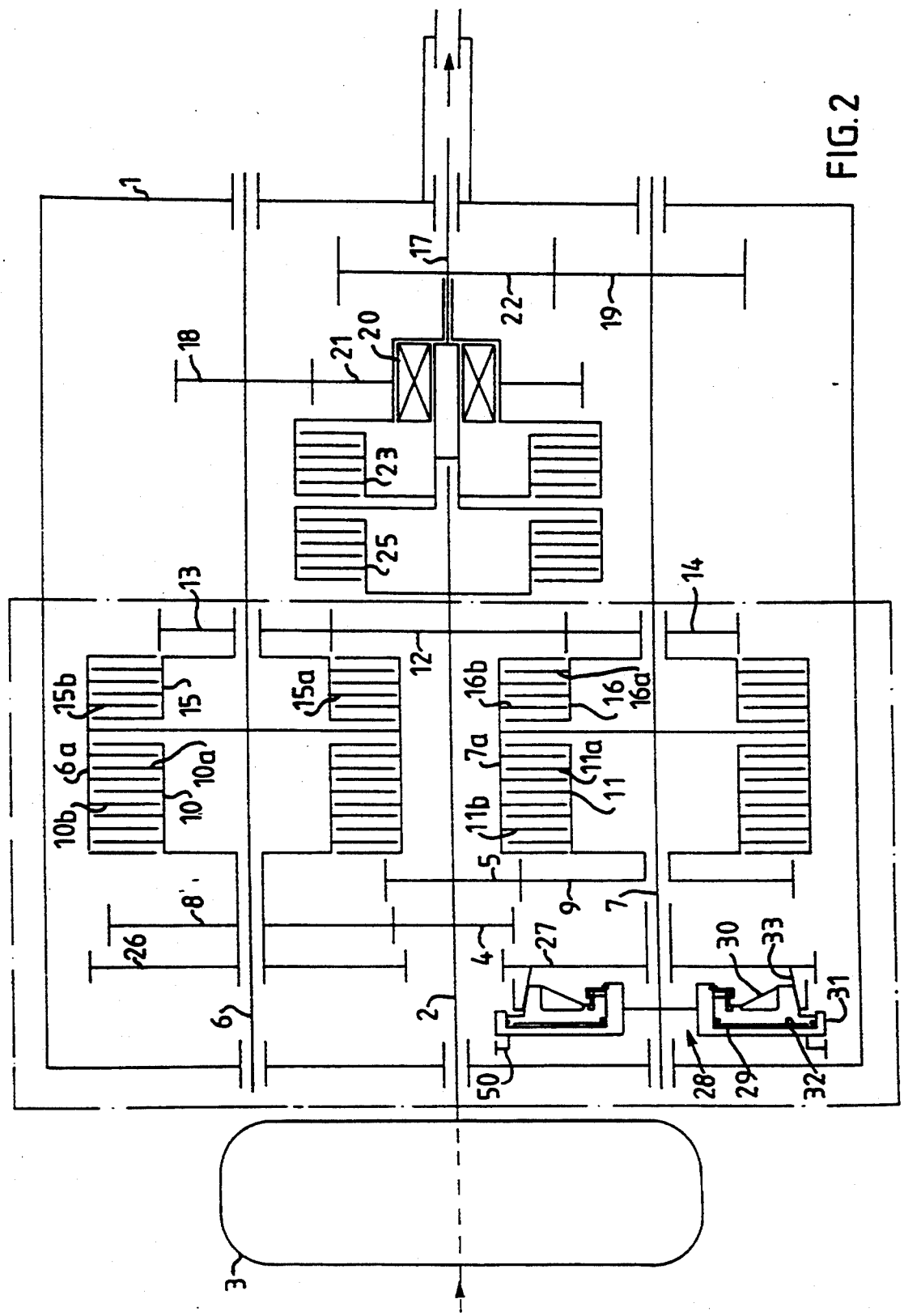
FIG. 2 shows a schematic longitudinal section along the line I—I in FIG. 1.

The transmission shown in FIGS. 1 and 2 has a housing 1 with an input shaft 2 which is driven by an engine (not shown) via a conventional hydraulic torque converter 3. The input shaft 2 has a pair of driving gears 4 and 5 fixed to the shaft 2. Driving gear 4 is in engagement with a rotatably mounted gear 8 on a first countershaft 6 and driving gear 5 is in engagement with a rotatably mounted gear 9 on a second counter shaft 7. The gears 8 and 9 can be locked to their respective countershafts by means of first and second multidisk interleaf wet clutches 10 and 11 respectively.

The input shaft 2 has a further gear 12 non rotatably fixed to the shaft, said gear 12 engaging gear 13 rotatably mounted on countershaft 6 and gear 14 rotatably mounted on countershaft 7. Said gears 13 and 14 can be locked to their respective shafts by third and fourth multidisk interleaf wet clutches 15 and 16. Countershaft 7 drives an output shaft 17 via a gear 19 non-rotatably joined to the countershaft 7 and engaging a gear 22 non-rotatably fixed to the output shaft 17. Countershaft 6 drives the output shaft 17 via a gear 18 non rotatably mounted on countershaft 6 and engaging a gear 21 mounted on said output shaft 17 via a one-way clutch 20. The one-way clutch 20 can be locked by means of a multi-disk interleaf wet clutch 23. The input and output shafts can be locked together by means of a multi-disk interleaf wet clutch 25.

The clutch 10 has a leaf package 10a and the clutch 15 has a leaf package 15a, which packages are non-rotatably joined to their respective gears 8 and 13 and which cooperate with two sets of leaves 10b and 15b which are non-rotatably joined to the countershaft 6 via a common housing 6a. The clutch 11 has a leaf package 11a and the clutch 16 has a leaf package 16a, each package being non-rotatably joined to its respective gear 9 and 14 respectively and co-operating with their respective leaf sets 11b and 16b, which are non-rotatably joined to the countershaft 7 via a common housing 7a.

On the countershaft 6 there is mounted a gear 26 for rotation together with gear 8. Gear 26 engages a reversing gear 27 which is freely rotatably mounted on the countershaft 7 and can be locked onto the shaft 7 by means of a conical clutch, generally designated 28, which comprises a clutch cone 30 joined to an axially displaceable annular hydraulic piston 29. Between the piston 29 and an annular cylinder element 31, solidly joined to the shaft 7, there is delimited an annular chamber 32. When oil is supplied to the chamber 32, the piston 29 is displaced axially and its clutch cone 30 is brought into engagement with a complementary clutch cone 33 which is solidly joined to reversing gear 27 so that it is locked to the countershaft 7.

Shifting in the transmission described is controlled by an electronic microprocessor regulated control system (not shown), which actuates a hydraulic operating system (not shown), controlling engagement and disengagement of the respective clutches.

In the different gear speeds, torque is transmitted from the input to the output shaft as follows:

First: Gear pair 4, 8, clutch 10 engaged, gear pair 18, 21 and one-way clutch 20;
Second: Gear pair 5, 9, clutch 11 engaged and gear pair 19, 22;
Third: Gear pair 12, 13, clutch 15 engaged, gear pair 18, 21 and one-way clutch 20;
Fourth: Gear pair 12, 14, clutch 16 engaged and gear pair 19, 22;
Fifth: Clutch 25 engaged (direct drive);
Reverse: Gear pair 4, 8, clutch 10 disengaged, gear pair 26, 27, conical clutch 28 engaged and gear pair 19, 22.

Figure 3:
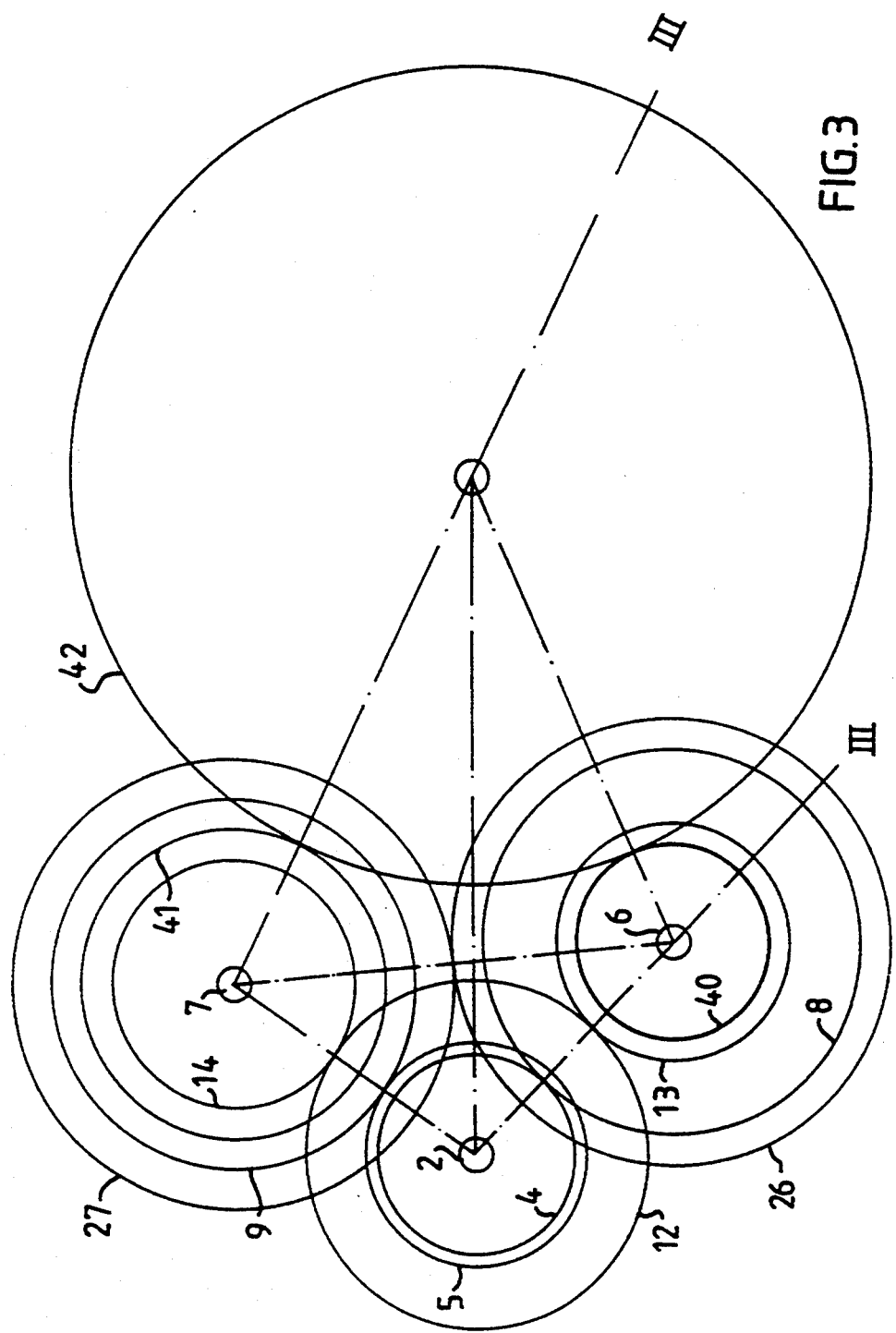
FIG. 3 shows a schematic end view of a transmission according to the invention for front-wheel drive and FIG. 4 shows a schematic longitudinal section along the line III—III in FIG. 3.
Figure 4:
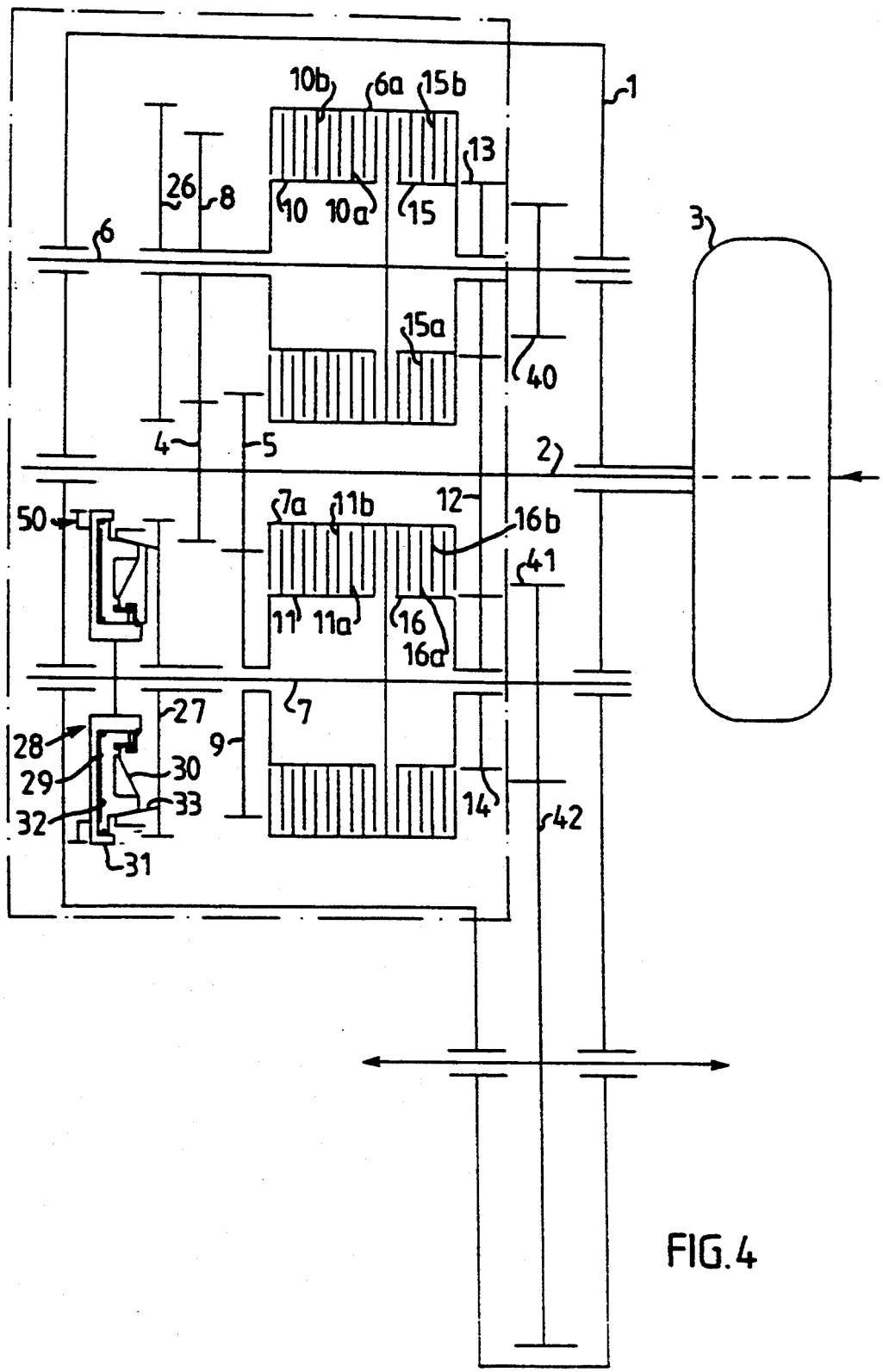

FIGS. 3 and 4 show a transmission for front-wheel drive and a transverse engine. Components corresponding to those in FIGS. 1 and 2 have been given the same reference numerals as in FIGS. 1 and 2. As can be seen in the Figures, there is complete identity between the drive means in the areas enclosed by the dash-dot lines with the exception of a minor variation in the diameters of the gear pairs 4, 8 and 5, 9. The front-wheel drive transmission has four forward speeds and thus has no output shaft 17 (FIGS. 1 and 2) nor does it have the associated clutch means 23, 25 for the fifth gear. Instead the two counter shafts 6, 7 are each provided with a non-rotatably fixed gear 40, 41 directly engaging the crown gear 42 of the differential.

In addition to the components described above, both transmissions include a parking gear 50 which is nonrotatably joined to the cylinder element 31 and to the countershaft 7. A blocking element (not shown) is disposed so that when the gear selector is moved to its park position, the blocking element engages the teeth of the parking gear 50 thus locking the countershaft 7 and the output shaft 17 or the crown gear 42 as well.

One advantage of the above described arrangement according to the invention which has not been mentioned previously is that since all forward gear speeds can be obtained in two shift stages, this provides a quiet transmission with a relatively high efficiency.

Modifications of the invention herein disclosed will occur to a person skilled in the art and all such modifications are deemed to be within the scope of this invention as defined by the appended claims.

I claim:

1. Automatic transmission for motor vehicles, comprising a single input shaft driven by a torque converter, two counter shafts alternately driveable by the input shaft, an output element and gears grouped in pairs on the shafts for driving the output element from the input shaft via one of the counter shafts, at least one gear in each gear pair co-operating between the input shaft and the respective counter shaft being freely rotatably mounted on its associated shaft and being lockable to the shaft by means of a friction clutch, said counter shafts (6, 7) having at least one pair of gears (13, 14) rotatably mounted and lockable to their respective shafts by a friction clutch (15, 16) and engaging a common driving gear (12) non-rotatably mounted on the single input shaft (2), and at least two additional gears (8, 9) freely rotatably mounted and lockable to their respective counter shafts by a friction clutch (10, 11), said additional two gears engaging different driving gears (4, 5) on said single input shaft.

2. Transmission according to claim 1, wherein said pair of gears (8, 9) on their respective counter shafts (6, 7) are each joined to an individual leaf package (15a, 16a and 10a, 11a respectively), each co-operating with an individual leaf package (15b, 16b and 10b, 11b respectively) joined to the respective counter shafts (6, 7) to form a leaf clutch pair.

3. Transmission according to claim 2, said leaf packages (10a, 11a and 15a, 16a respectively) joined to the respective counter shafts are housed in common clutch housings (6a, 7a) non-rotatably joined to the respective counter shafts.

4. Transmission according to claim 1, wherein one of said additional gear (8) on one of the counter shafts (6) is disposed for rotation together with a reversing gear (26) which engages a reversing gear (27) rotatably mounted on the other countershaft (7) and which can be locked to said countershaft by means of a conical clutch (28).

5. Transmission according to claim 1, wherein said output element is formed of a crown gear (42) and a differential and that the counter shafts (6, 7) each have a gear (40, 41) in engagement with the crown gear.

6. Transmission according to claim 1, wherein said output element consists of an output shaft (17), a rotational axis of which coincides with a rotational axis of the input shaft (2), and wherein each of the counter shafts (6, 7) has a gear (18, 19) in engagement with an individual gear (21, 22) on said output shaft (17).

* * * * *